United States Patent Office 3,086,444
Patented Apr. 23, 1963

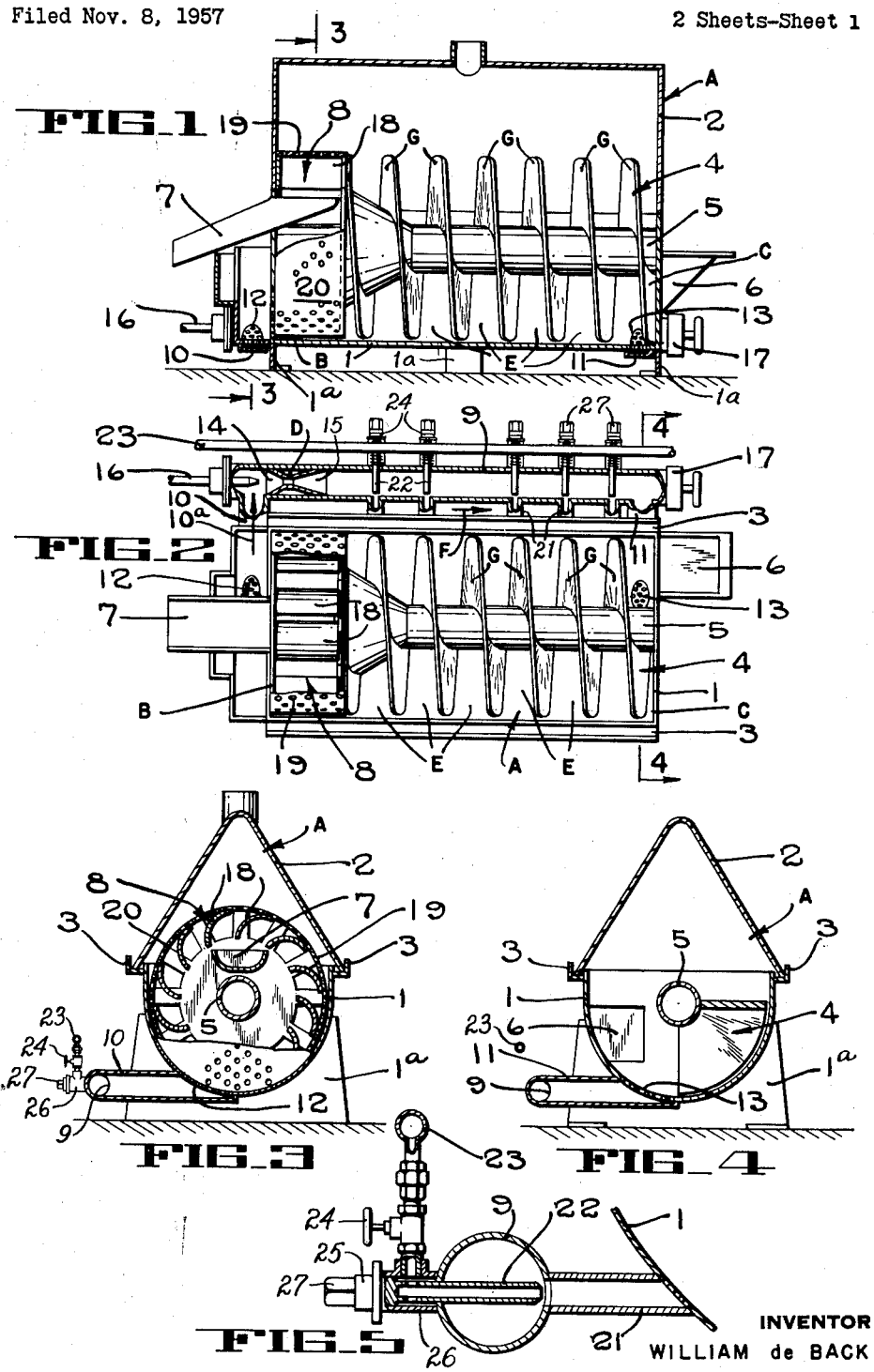

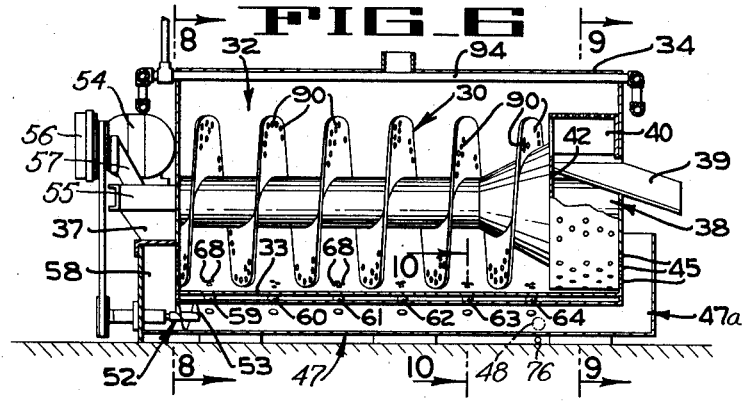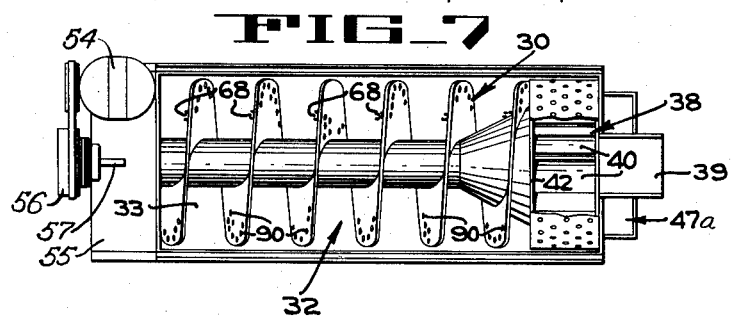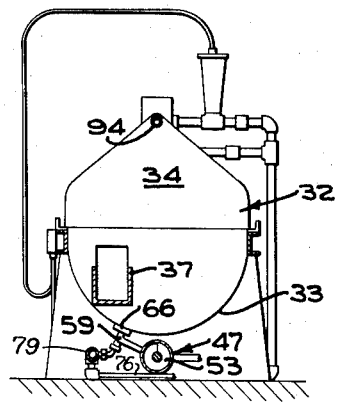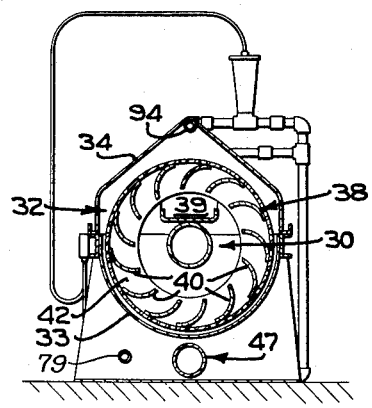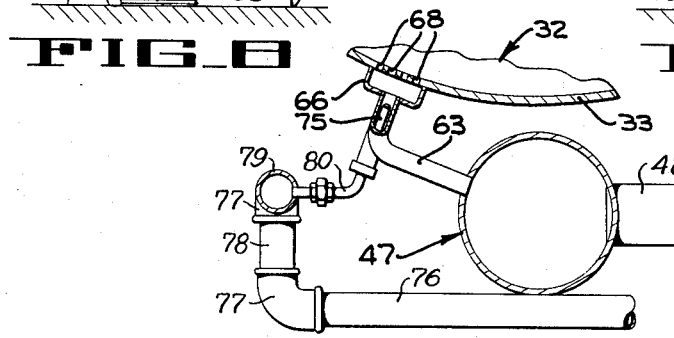
INVENTOR
WILLIAM de BACK

3,086,444
APPARATUS FOR BLANCHING COMESTIBLES
William de Back, San Jose, Calif.
Filed Nov. 8, 1957, Ser. No. 695,283
6 Claims. (Cl. 99—239)

The present invention relates to a method and apparatus for scalding or blanching vegetables or fruit prior to further treatment thereof.

The blanching of vegetables or fruit, such as green peas, prior to canning or freezing thereof, has, up to the present, been carried out in apparatus having perforated rotatable drums by the action of a liquid raised to a certain temperature, but difficulties always arose owing to the fact that the products were damaged by the rotation of the drums and that the scalding was not uniform.

An object of the present invention is to provide a machine for scalding vegetables and fruit which will not cause deterioration of the vegetables or fruit while they are in the machine, and which is capable of performing the scalding operation with a desired degree of uniformity and intensity.

Another object is to provide a machine for blanching vegetables in which the product to be treated is not in direct contact with the steam, and wherein rubbing or rolling of the product on metal parts of the machine is prevented.

Another object is to provide a machine constructed and arranged to reduce the formation of thermophilic bacteria and to prevent therefore the fermentation of the treated product at certain temperatures.

A further object of the present invention is to provide a blanching machine of simple and inexpensive construction which may be easily cleaned.

Another object of the invention is to provide a blancher having improved apparatus for preventing the accumulation of a detrimental quantity of bacteria therein.

Another object is to provide means for preventing the condensation of vapors within a blanching machine.

Another object is to provide an improved means for circulating scalding water in a blanching machine.

These and other objects and advantages of the present invention will become apparent from the following description and drawings in which:

FIG. 1 is a vertical longitudinal section of the blanching machine of the present invention, with parts broken away and parts shown in elevation.

FIG. 2 is a plan view of the machine of FIG. 1 with the cover removed; certain parts are shown in section while others are shown in elevation.

FIG. 3 is a vertical section taken along line 3—3 of FIG. 1.

FIG. 4 is a vertical section taken along line 4—4 of FIG. 2.

FIG. 5 is a fragmentary section taken through a portion of the liquid circulating apparatus of the machine of FIG. 1, said section being taken centrally through any one of several identical lateral hot water supply conduits.

FIG. 6 is a vertical longitudinal section taken centrally through a second embodiment of the blanching machine of the present invention.

FIG. 7 is a plan view of the machine of FIG. 6, with the cover removed.

FIG. 8 is a vertical section taken on line 8—8 of FIG. 6.

FIG. 9 is a vertical section taken on line 9—9 of FIG. 6.

FIG. 10 is an enlarged fragmentary vertical section taken on line 10—10 of FIG. 6.

The present application is a continuation-in-part of my copending, now abandoned, application Serial Number 521,863 filed July 13, 1955.

The apparatus of the present invention comprises a tank A (FIGS. 1–4) having a lower generally semi-cylindrical portion 1 and a removable truncated upper portion 2 resting in grooves 3 which are provided on the upper edges of the lower semi-cylindrical part 1. The entire tank A rests on supports 1a.

A screw 4 of the Archimedean type is disposed in the tank A. This screw, which is formed around a shaft 5 and conforms accurately to the lower part of the tank, is mounted for rotation in the tank and is driven in any convenient manner.

The fruit or vegetable to be blanched are introduced into the tank A through a hopper 6 and are advanced through the tank and into a bucket conveyor 8, disposed in the tank adjacent the end of the screw 4, from which they are discharged through an inclined chute 7.

The machine is provided with a pipe 9, disposed exterior of the tank along one of the longitudinal sides thereof. The pipe 9 establishes communication between the rear portion B and front portion C of the tank, and is connected by short conduits 10 and 11, respectively, with a discharge opening 12 ((FIG. 3) for the liquid, and an inlet opening 13 (FIG. 4) in the tank.

The pipe 9 is provided, near the discharge conduit 10, with a venturi device D comprising a converging conduit 14 and a diverging conduit 15 while a pipe 16 is disposed co-axial with the pipe 9, for admitting steam under pressure into the converging conduit 14. The injection of steam is used for producing the circulation of the water and for heating the water to the desired temperature.

The end of the pipe 9 (FIG. 2), opposite the steam inlet pipe 16, is closed by a plug 17 disposed beyond the inlet pipe 11.

It should be noted that it is not a function of the screw 4 to displace or translate the material to be treated, but to define in the lower part of the tank A a series of closed chambers E bounded in each case by the wal of the tank A and by the two successive blades G of the screw. This function will be further explained as the description proceeds. These chambers or spaces E contain a mixture of water and material to be scalded. This mixture is maintained at a predetermined scalding temperature and the material is advanced through the tank A in the correct time required for the scalding operation.

It should therefore be noted that the product to be treated is withheld from unfavorable influences which could be caused by variations of temperature, hot or cold currents of water and direct contact with jets of steam. Consequently the scalding of the treated material is effected in a uniform manner at the selected temperature.

The jet of steam introduced through the pipe 16 does not only cause the circulation of the product in the chambers E of the tank A, but also re-heats the re-circulated scalding liquid to the desired temperature. This jet of steam, combined with the Venturi effect, exerts a pull on the liquid in the tank in the direction of arrow 10a through the discharge pipe 10 and subjects the liquid in the pipe 9 to a slight pressure so as to cause a circulation of the liquid in the tank A from the discharge pipe 10 to the inlet pipe 11 in the direction of arrow F (FIG. 2). The rate of discharge of the blanching liquid should be large enough to cause the liquid to flow through the tank faster than the products being treated, whereby the product will be continuously agitated and submerged in liquid. As a result of the improved heat transfer contact of the product and the liquid, the liquid may be maintained at temperatures lower than the detrimental high temperatures heretofore considered necessary. Further, the fact that the liquid moves faster than the product assures that the product will be washed away from the advancing blade of the screw 4 and therefore it is impossible for the product to get mashed between the advancing blade and the wall of the tank.

The blanching liquid passing through each compartment E tends to move the product along at a faster rate than the rate permitted by the advancing blades. The product is not moved by a blade pushing from behind; it is rather retarded by the blade ahead. The screw 4 therefore regulates the rate at which the product is permitted to advance through the tank.

After the treated products have passed through the apparatus they are received in the buckets 18 of the conveyor 8 which remove them from the liquid of the tank A and discharge them into the chute 7 while the blanching water passes through the holes 19 in the drum 20 and flows through the opening 12 into the pipe 9 where it is reheated to the desired temperature and re-introduced into the tank A through the inlet pipe 11. The circulation of the water may thus be very easily regulated by the jet of steam and automatic apparatus may be provided for regulating the temperature and the scalding time.

Since the product is coldest when it enters the tank, it is desirable that more heat be applied in the chamber closest to the inlet. When the heat supplied to the chambers progressively decreases from inlet to outlet of the tank, the blanching is carried on at a substantially uniform, desirable temperature. Accordingly, independently of the circulation, automatic control of the temperature in each chamber E, bounded by the two successive blade or partition portions of the screw 4, may be provided. Such automatic temperature control in the chambers E may be obtained by providing lateral hot water supply conduits 21 (FIG. 5) for the tank A which branch from the pipe 9. Steam discharge jets 22, which are connected with a steam conduit 23 and are individually regulated by valves 24, are adapted to discharge jets of steam into their corresponding conduits 21 and effect the introduction of reheated water from the conduit 9 directly into the chambers E to maintain the proper scalding temperature therein. Each steam discharge jet 22 includes a body 25 which is screwed into a pipe fitting 26 that is secured to and communicates with the pipe 9. The body 25 includes a tubular nozzle portion at one end and a square head 27 at the other end for acceptance of a tool for tightening the jet 22 in fluid tight engagement against the pipe fitting 26.

The truncated form of the cover 2 permits easy guidance of the condensate, which may be bacteria-laden, toward and into the grooves 3, from the open ends of which the condensate is discharged externally of the machine without returning to the scalding liquid and product to be treated.

In FIGS. 6 through 10 a second embodiment of the blanching machine of the present invention is illustrated. In this embodiment a helical screw 30 is journalled for rotation in a tank 32 and is driven by any suitable drive means (not shown). The tank 32 has a generally semi-cylindrical lower portion 33 (FIG. 9) and an inverted V-shaped cover 34.

The fruit or vegetables to be blanched are introduced into the tank through a hopper 37 (FIG. 6) and are advanced through the tank and into an annular bucket conveyor 38 which lifts them up and discharges them into an inclined chute 39 (FIG. 6). The bucket conveyor 38 comprises a plurality of curved vanes 40 (FIG. 9) which are secured to and project outwardly from a plate 42 (FIG. 6) welded to the end of the screw 30. The end wall of the tank 32 adjacent the conveyor 38 is provided with a plurality of perforations 45 through which water is discharged from the tank into an open-topped portion 47a of a main supply manifold 47. Water is supplied to the manifold 47 from any suitable source through the feed pipe 48 (FIG. 10).

Water is circulated through the tank by means of a pump 52 having a helical pumping element 53 disposed in the supply manifold 47. The pump 52 is driven by a motor 54 (FIGS. 6 and 7), mounted on an extension 55 of the tank framework. A belt connects the motor to an idler pulley 56 which in turn is connected by a belt to the pump 52. The idler pulley 56 is mounted for rotation on the extension 55 of the tank framework, on a diagonal bracket 57. The main supply manifold extends longitudinally below the central portion of the tank and communicates with the tank through a main inlet conduit 58 and a plurality of auxiliary conduits 59, 60, 61, 62, 63 and 64. At the point each auxiliary conduit communicates with the interior of the tank the auxiliary conduit has an enlarged chamber 66 (FIG. 10). A plurality of openings 68 are provided in the tank wall adjacent each chamber 66.

The water is heated by means of a plurality of nozzles 75, each of which extends into one of the auxiliary water conduits and is arranged to direct steam into the associated chamber 66. Steam is supplied to the nozzles 75 from any suitable source through a main line 76 which is connected by means of elbows 77 and a nipple 78 to a longitudinally extending pipe 79 which is, in turn, connected to the nozzles 75 by conduits 80. With this arrangement, the steam, from the nozzles 75 does not actually enter the tank but heats the water in the enlarged chamber and forces it through openings 68 into the tank. Since the auxiliary inlet conduits are spaced apart a distance substantially equal to the distance between adjacent portions of the helical screw, it will be evident that a uniform temperature of water may be maintained throughout the length of the tank by heating the water in the separate inlet chambers 66 as desired.

The pump 52 forces water through the tank at a speed that is greater than the speed with which the comestibles are permitted to advance by the rotating screw. To assure the proper flow of liquid past the vanes, a plurality of perforations 90 of desired size and number are provided in the vanes. Thus, the comestibles are actually moved along the tank by the water at a rate of speed dictated by the rotating screw.

In the embodiment of FIG. 6, a steam pipe 94 is disposed in the peak of the slanted hood or cover 34 of the tank. This heated pipe maintains the temperature high enough to prevent condensation from forming in the upper portion of the tank. Similarly, the heated steam pipe 94 will heat the hood and prevent condensation from forming on the walls of the hood also. A temperature, which is greater than 160° F. and is preferably the same as the temperature of the water being circulated through the tank, is desirable under the hood to prevent the growth of bacteria.

Thermophilic bacteria, commonly known as "flatsour" bacteria tend to grow rapidly in blanching equipment. The incidence of these organisms in a blancher must be maintained at a low level in order to minimize the possibility of the product spoiling after it has been sealed into cans. A concentration of one viable organism per gram of blanched product is permissible for most products. The washing and cooking operations which follow blanching further reduce this concentration to a harmless level and an entirely satisfactory product results.

It will be understood that modifications and variations of the invention disclosed herein may be made without departing from the scope of the present invention.

Having thus described the invention, what is claimed as new and is desired to be protected by Letters Patent is:

1. Apparatus for scalding a product such as fruit or vegetables comprising an elongated tank having a generally semi-cylindrical bottom wall and a pair of spaced side walls extending upwardly from said bottom wall, a rotatable screw extending along said cylindrical bottom wall and having a spiraled blade for controlling the movement of a mixture of the product to be scalded and a heated liquid lengthwise through said tank, a drain trough formed on the upper edge of each side wall and arranged to discharge outwardly of said tank, and a cover of generally inverted V-shape disposed over said tank with its lower edges disposed in said drain troughs for directing condensate which forms on the inner surface of said cover into said troughs for discharge outwardly of said tank.

2. Apparatus for treating comestibles comprising an elongated tank having a rounded bottom wall and a cover portion; means for moving a quantity of heated liquid along said bottom wall in a predetermined direction at a first velocity for transporting a quantity of comestibles therewith; means for retarding the velocity of movement of the comestibles with respect to the flowing liquid comprising a rotating screw having a spiraled blade located in the tank bottom, adjacent portions of the blade defining compartments containing comestibles, the speed of rotation of the screw being such as to permit the advance of the comestibles with the compartments at a second velocity, said first velocity being greater than said second; and means located under the cover of said tank for discharging bacteria-laden condensate outwardly of said tank away from the comestibles in the bottom of the tank.

3. Apparatus for treating comestibles comprising an elongated tank, means for moving a liquid longitudinally through said tank in a predetermined direction at a first linear speed for transporting comestibles therewith, and means for retarding the flow of cosmestibles in said predetermined direction with respect to said liquid comprising a plurality of spaced-apart partition members inserted into the moving stream of comestibles and positioned adjacent the bottom of the tank, said partition members being operable to restrict movement of comestibles in the direction of liquid flow to a second linear speed, said second speed being slower than said first speed.

4. An apparatus as set forth in claim 3, wherein said tank has a generally semi-cylindrical lower portion and a hood of inverted V-shape, with a conduit for heated fluid disposed under said hood adjacent the peak thereof, and means for directing heated fluid through said conduit at a temperature and in amount adapted to heat the gases under said hood to a temperature above 160° F.

5. Apparatus for treating comestibles comprising an elongated tank having a rounded bottom wall and a cover portion; means for moving a quantity of heated liquid along said bottom wall at a first velocity for transporting a quantity of comestibles therewith; means for retarding the velocity of movement of the comestibles with respect to the flowing liquid comprising a rotating screw having a spiraled blade located in the tank bottom, adjacent portions of the blade defining compartments containing comestibles, the speed of rotation of the screw being such as to permit the advance of the comestibles in the compartment at a second velocity, said first velocity being greater than said second; and means located under the cover of said tank for maintaining said cover and the gases thereunder at a temperature sufficiently high to inhibit the growth of bacteria.

6. Apparatus for scalding comestibles comprising a tank, means for depositing said comestibles in said tank adjacent one end thereof, means providing a series of chambers movable longitudinally in a predetermined direction in said tank at a predetermined velocity adjacent the inner surface of said tank for maintaining the movement of said comestibles longitudinally of said tank at said predetermined velocity, means for supplying heated liquid to said one end of said tank in sufficient volume so that the velocity of said liquid in said predetermined direction in said tank is higher than said predetermined velocity of said comestibles to cause a flow of liquid between said chambers and the inner surface of said tank to move the comestibles along said tank at a velocity limited by the velocity of said chambers, means for discharging said comestibles from said tank adjacent the other end thereof and means for discharging said heated liquid independently of said comestibles from said other end of said tank and for recirculating said liquid to said liquid supplying means.

References Cited in the file of this patent

UNITED STATES PATENTS

| | | |
|---|---|---|
| 697,272 | Plummer | Apr. 8, 1902 |
| 1,168,799 | Grier | Jan. 18, 1916 |
| 1,609,705 | Forrest | Dec. 7, 1926 |
| 1,686,096 | Manning | Oct. 2, 1928 |
| 2,126,365 | Alexopoalos | Aug. 9, 1938 |
| 2,220,125 | Seaton | Nov. 5, 1940 |
| 2,278,701 | Karr | Apr. 7, 1942 |
| 2,374,425 | Weerth | Apr. 24, 1945 |
| 2,517,236 | Plummer | Aug. 1, 1950 |
| 2,517,942 | Ten Eyck | Aug. 8, 1950 |
| 2,610,914 | Cassidy et al. | Sept. 16, 1952 |
| 2,631,099 | Bonotto | Mar. 10, 1953 |
| 2,805,639 | Martin | Sept. 10, 1957 |
| 2,907,561 | Newsom | Oct. 6, 1959 |

FOREIGN PATENTS

| | | |
|---|---|---|
| 74,475 | Denmark | July 21, 1952 |